US007289488B2

(12) United States Patent
Qu

(10) Patent No.: US 7,289,488 B2
(45) Date of Patent: Oct. 30, 2007

(54) METHOD FOR AUTOMATICALLY CONFIGURING A DSLAM TO RECOGNIZE CUSTOMER PREMISES EQUIPMENT

(75) Inventor: Jian Qu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 10/755,191

(22) Filed: Jan. 9, 2004

(65) Prior Publication Data

US 2005/0152371 A1    Jul. 14, 2005

(51) Int. Cl.
*H04L 12/28* (2006.01)
*H04L 12/56* (2006.01)

(52) U.S. Cl. .................... 370/352; 370/395.1; 370/465

(58) Field of Classification Search ........ 370/352–356, 370/359, 401, 464, 395.2, 395.1, 395.21, 370/465, 239, 230, 235
See application file for complete search history.

(56) References Cited

U.S. PATENT DOCUMENTS

| | | | | |
|---|---|---|---|---|
| 6,128,659 | A | 10/2000 | Subblah et al. ............. 709/225 |
| 6,430,273 | B1 | 8/2002 | Shaheen .................. 379/93.14 |
| 6,493,348 | B1 | 12/2002 | Gelman et al. ............. 370/401 |
| 6,661,795 | B1 | 12/2003 | Adas et al. ............... 370/395.1 |
| 6,807,178 | B1 | 10/2004 | Lemieux .................. 370/395.2 |
| 6,977,922 | B2 | 12/2005 | Blanset et al. ............. 370/352 |
| 2002/0106075 | A1* | 8/2002 | Foss et al. ................ 379/399.01 |
| 2003/0091034 | A1 | 5/2003 | Koistinen .................. 370/352 |
| 2003/0123648 | A1 | 7/2003 | Ashton et al. ............. 379/403 |
| 2003/0231620 | A1 | 12/2003 | Yasumoto .................. 370/352 |
| 2005/0013301 | A1 | 1/2005 | Bouchat et al. .......... 370/395.5 |
| 2005/0152370 | A1* | 7/2005 | Meehan et al. ............. 370/393 |
| 2005/0163057 | A1 | 7/2005 | Blackburn .................. 370/252 |
| 2005/0163128 | A1 | 7/2005 | Blackburn ............. 370/395.21 |
| 2005/0163286 | A1 | 7/2005 | Jiang et al. ................ 379/1.04 |
| 2006/0161643 | A1* | 7/2006 | Senapati et al. ............ 709/220 |
| 2006/0285546 | A1* | 12/2006 | Carew et al. ................ 370/401 |

OTHER PUBLICATIONS

"Notification of Transmittal of the International Search Report and the Written Opinion of the International Searching Authority, or the Declaration," Int'l Application No. PCT/US05/00113; date of mailing: Aug. 25, 2006; Int'l filing date: Jan. 4, 2005; 8 pgs.
Notes to Form PCT/ISA/220; 2 sheets, Jan. 2004.

* cited by examiner

*Primary Examiner*—Ajit Patel
(74) *Attorney, Agent, or Firm*—Baker Botts L.L.P.

(57) ABSTRACT

A method for automatically configuring a digital subscriber line add-drop multiplexer (DSLAM) includes receiving a request for a connection with unrecognized customer premises equipment at a DSLAM, establishing the connection between the DSLAM and the customer premises equipment, and associating the connection with a status having three possible states, which include an unverified state, a verified state, and an invalid state. The verified state indicates that the connection is allowed full access to a network, the unverified state indicates that the connection is allowed conditional access to the network, and the invalid state indicates that the connection is not allowed to access the network. The method further includes setting the status of the connection to unverified and authenticating the unrecognized customer premises equipment. If the unrecognized customer premises equipment is authenticated, the method includes setting the status of the connection to verified. If the unrecognized customer premises equipment is not authenticated, the method includes setting the status of the connection to invalid. The method also includes providing access to the network according to the current status of the connection.

24 Claims, 3 Drawing Sheets

METHOD FOR AUTOMATICALLY CONFIGURING A DSLAM TO RECOGNIZE CUSTOMER PREMISES EQUIPMENT

TECHNICAL FIELD OF THE INVENTION

This invention relates in general to telecommunications, and more particularly to a method for automatically configuring a DSLAM to recognize customer premises equipment.

BACKGROUND OF THE INVENTION

Digital subscriber line add/drop multiplexers (DSLAMs) receive information from a variety of customer premises and communicate that information to a backbone network. In order to receive information from customer premises, DSLAMs must be configured to recognize the customer premises equipment from which the information is being received. One solution for configuring the equipment is to maintain a table of information on the available connections at DSLAM. Customer premises equipment may then be manually configured based on the assignment scheme in the table. A drawback to this method is that it requires a visit to the customer premises, and it also requires information about the available connections on the DSLAM. Accordingly, there is a need for a method that would allow DSLAMs to be configured automatically to recognize customer premises equipment.

SUMMARY OF THE INVENTION

In one embodiment, a method for automatically configuring a digital subscriber line add-drop multiplexer (DSLAM) includes receiving a request for a connection with unrecognized customer premises equipment at a DSLAM, establishing the connection between the DSLAM and the customer premises equipment, and associating the connection with a status having three possible states, which include an unverified state, a verified state, and an invalid state. The verified state indicates that the connection is allowed full access to a network, the unverified state indicates that the connection is allowed conditional access to the network, and the invalid state indicates that the connection is not allowed to access the network. The method further includes setting the status of the connection to unverified and authenticating the unrecognized customer premises equipment. If the unrecognized customer premises equipment is authenticated, the method includes setting the status of the connection to verified. If the unrecognized customer premises equipment is not authenticated, the method includes setting the status of the connection to invalid. The method also includes providing access to the network according to the current status of the connection.

In another embodiment, a digital subscriber line add-drop multiplexer (DSLAM) includes an interface, a memory, and a processor. The interface receives a request for a connection with unrecognized customer premises equipment and establishes the connection with the unrecognized customer premises equipment. The memory stores a connection identifier and a status for the connection. The status has three possible states, which include an unverified state, a verified state, and an invalid state. The verified state indicates that the connection is allowed full access to a network, the unverified state indicates that the connection is allowed conditional access to the network, and the invalid state indicates that the connection is not allowed to access the network. The processor sets the status of the connection as unverified when the connection is established and authenticates the unrecognized customer premises equipment. The processor sets the status of the connection as verified if the customer premises equipment is authenticated, sets the status of the connection as invalid if the customer premises equipment is not authenticated, and provides access to the network according to the current status of the connection.

Important technical advantages of certain embodiments of the present invention include automatic configuration of a DSLAM. Certain embodiments of the present invention allow a DSLAM to recognize customer premises equipment connected to the DSLAM without requiring manual configuration of the customer premises equipment to recognize the DSLAM. This reduces time and expense associated with setting up customer premises equipment. It also increases the versatility of DSLAM, because customer premises devices may be changed out without requiring configuration to DSLAM.

Other important technical advantages of certain embodiments of the present invention include multicasting from the DSLAM. As DSLAM is configured to recognize different customer premises equipment, DSLAM can maintain a table of connections. This table may subsequently be used to broadcast information to all customer premises equipment coupled to DSLAM. Consequently, DSLAM may be used to communicate broadcasts even when the particular customer premises equipment to receive the information is not known. These cases would occur more frequently when customer premises equipment is not previously configured, and DSLAM may not have information that would normally be input during configuration.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a configuration table that may be maintained at a DSLAM;

DETAILED DESCRIPTION OF EXAMPLE EMBODIMENTS OF THE INVENTION

Figure 1:
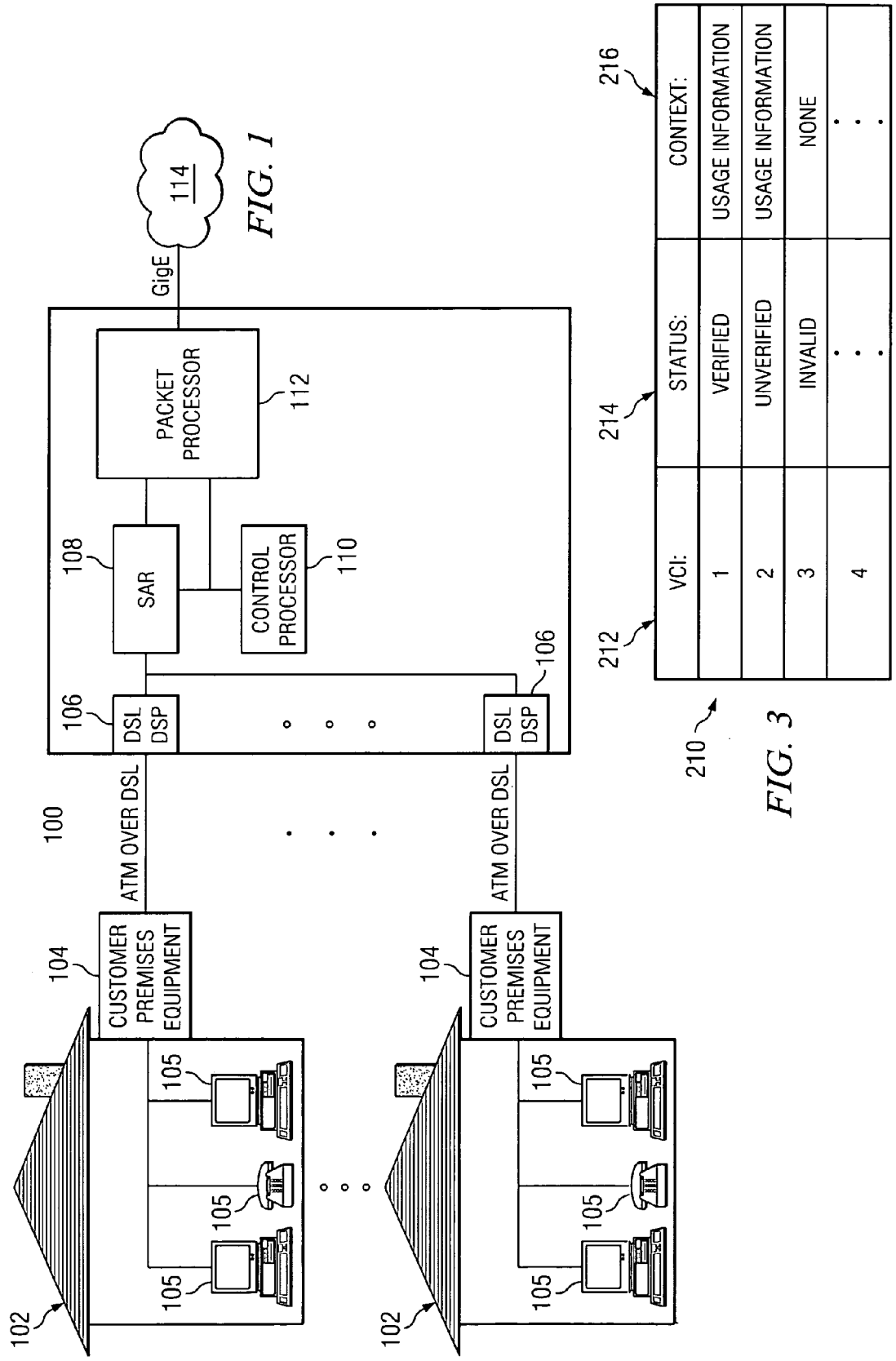
FIG. 1 shows a communications network that includes customer premises equipment coupled to a DSLAM.

FIG. 1 illustrates a network 100 that includes a digital subscriber line add/drop multiplexer (DSLAM) 101 coupled to several customer premises 102. At each of the customer premises 102 is customer premises equipment 104 that communicates with DSLAM 101. Customer premises equipment allows communication devices 105 at customer premises 102 to communicate with a backbone network 114 through DSLAM 101. DSLAM 101 thus provides access to backbone network 114 to communication devices 105. Backbone network 114 may communicate information in any suitable form, such as packets, cells, frames, segments, or other portions of information, using any suitable communication method, such as transfer control protocol/Internet protocol (TCP/IP), Ethernet, synchronous optical network (SONET), and/or asynchronous transfer mode (ATM).

DSLAM 101 includes any hardware and/or software for receiving information from customer premises equipment 104 and communicating information to backbone network 114. In a particular embodiment, DSLAM 101 receives information from customer premises equipment 104 in the form of asynchronous transfer mode (ATM) cells communicated over DSL. In this embodiment, DSLAM 101 extracts ATM cells from DSL signals using a DSL digital signal processor (DSP) 106. A segmentation and reassembly module (SAR) 108 extracts information ATM cells and converts it into a format suitable for use by backbone network 114. Control processor 110 may also assist in the process by rearranging information extracted from ATM cells, appending or removing headers, or performing any other information processing useful for making the information suitable for routing to backbone network 114. Packet processor 112 receives information from SAR 108 and control processor 110 in the form of packets and communicates information to backbone network 114. SAR 108, control processor 110, and packet processor 112 generally describe functional modules of DSLAM 101, but it should be understood that the functions performed by these particular components may be distributed among several components or consolidated within shared components without substantially changing the operation of DSLAM 101.

Customer premises equipment 104 represents any suitable hardware and/or software for receiving information from communication devices 105 and communicating this information in a suitable format to DSLAM 101. Customer premises equipment 104 may perform any suitable conversion, formatting, or processing of information from communication devices 105. Communication devices 105 may include any form of device that exchanges information using backbone network 114. Communication devices 105 may include personal computers, peripherals, internet protocol telephones (IP phones), hubs, routers, or other suitable devices. Information sent from customer premises equipment 104 is associated with some identifying information indicating the origin of the information. In a particular embodiment, customer premises equipment 104 communicates ATM cells over DSL. In such an embodiment, the identifier for the information could be a virtual channel identifier (VCI) or virtual path identifier (VPI).

Customer premises equipment 104 also extracts information from ATM cells received from DSLAM 101. In one example, DSLAM 101 receives information intended for customer premises equipment 104 from backbone network 114. Packet processor 112 passes the information to SAR 108, which looks up the appropriate destination for the information. Alternatively, SAR 108 may broadcast information to several customer premises 102 if the destination of the information is unknown. SAR 108 converts packet information from backbone network 114 into ATM cells along with appropriate identifiers associated with the destination customer premises equipment 104. These ATM cells are sent to DSL DSPs 106 which convert the ATM cells into DSL signals that are communicated to customer premises equipment 104.

In operation, customer premises equipment 104 communicates information to DSLAM 101. If customer premises equipment 104 has previously communicated with DSLAM 101 and has been recognized by DSLAM 101, then information exchange takes place in the normal manner described above. However, if customer premises equipment 104 is not recognized by DSLAM 101, then DSLAM 101 treats the channel from which the information was received as "unverified." This status indicates that customer premises equipment 104 has not yet been recognized by DSLAM 101. Control processor 110 may then verify whether the information received from customer premises equipment 104 from the unverified connection is authorized to be sent to backbone network 114. If the information is authorized, SAR 108 updates a configuration table to associate a VCI for the customer premises equipment 104 with the authenticated connection. Once that has taken place, the connection is then considered "verified," and subsequent information received over that connection will be sent normally. Thus, DSLAM 101 may configure itself to recognize customer premises equipment 104 even when customer premises equipment 104 has not been programmed with information about how DSLAM 101 has been configured.

Figure 2:
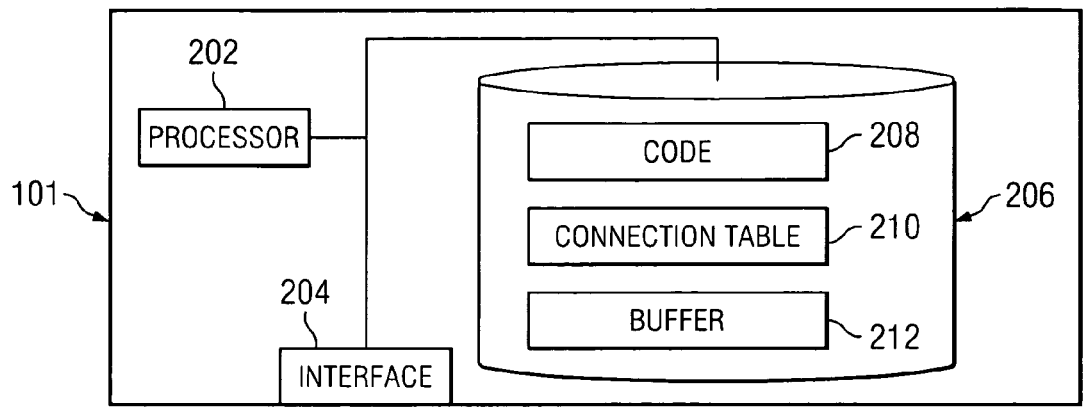
FIG. 2 shows one embodiment of a DSLAM that includes configuration tables.

FIG. 2 shows one embodiment of DSLAM 101. In the depicted embodiment, DSLAM 101 includes a processor 202, an interface 204, and a memory 206. Processor 202 represents any hardware and/or software component useful for processing information and performing various tasks of DSLAM 101. In a particular embodiment, processor 202 performs any suitable tasks of SAR 108, control processor 110, or packet processor 112 described above.

Interface 204 represents any port or connection suitable for exchanging information with backbone network 114 and/or customer premises equipment 104. In a particular embodiment, interface 204 may include physical layer devices such as DSL DSPs 106, as well as suitable connections for communicating information to backbone network 114. The functions performed by interface 204 may be distributed among several different hardware or software components of DSLAM 101, or may be consolidated within shared components.

Memory 206 represents any suitable form of information storage for DSLAM 101. Memory 206 may include magnetic media, optical media, removable media, local storage, remote storage, or any other suitable information storage medium. Memory 206 stores code 208, which represents instructions executed by processor 202 to perform various tasks of DSLAM 101. Memory 206 also stores connection table 210. Connection table 210 maintains information on the status of particular connections formed by DSLAM 101 with customer premises equipment 104. Connection table 210 also maintains a status for each connection so that DSLAM 101 may recognize whether the information received from customer premises equipment 104 is verified, unverified, or invalid. Invalid connections are unauthorized attempts to communicate information to backbone network 114, and accordingly, information from those connections is discarded.

In operation, DSLAM 101 receives information from customer premises equipment 104 which is converted into a suitable form by interface 204. Processor 202 then determines based on the information in connection table 210 whether any information has previously been received from this connection. If information has not previously been received from this connection, processor 202 may create a new entry in connection table 210 that indicates that the connection is unverified. If information is received from a verified connection, processor 202 may forward the information to backbone network 114 using interface 204. If information is received from a connection that has already been determined to be invalid, then processor 202 may discard the information. For unverified connections, processor 202 may store packets in a buffer 212 in memory 206 while it is being determined whether the connection is valid or not.

Processor 202 also determines whether a connection is valid. To do so, processor 202 compares authentication in the information received from customer premises equipment 104 to information stored in memory 206. If the information is not authenticated, processor 202 may treat the connection as invalid and appropriately update connection table 210. On the other hand, if information is authenticated, processor 202 may update connection table 210 to reflect that the connection has been verified.

DSLAM 101 may also receive information from backbone network 114. In this case, processor 202 receives data from interface 204. Processor 202 analyzes the information to determine destination customer premises equipment 104 for the information. To send information to customer premises equipment 104 with a known destination, processor 202 looks up the appropriate customer premises equipment 104 in connection table 210, and communicates the information to customer premises equipment 104 using interface 204. Alternatively, if there is no recognized destination, processor 202 may broadcast the information. If no destination is specified or if the identity of the destination is unclear from connection table 210, processor 202 may copy the packet or other information received, and communicate it to each customer premises equipment 104 identified in connection table 210. Packets may be buffered in buffer 212 before they are communicated to customer premises equipment 104.

FIG. 3 is one example of a connection table 210 used by certain embodiments of DSLAM 101. In the depicted embodiment, each connection is identified by a VCI 212. Table 210 associates particular information about each connection with VCI 212. For each connection, table 210 includes a status 214. Status 214 indicates whether each connection is verified, unverified, or invalid. A verified connection is a connection that has been authenticated according to an appropriate security procedure so that customer premises equipment 104 associated with that connection is authorized to send information to backbone network 114. An unverified connection is a connection that has been established with customer premises equipment 104 that has not yet been authenticated by DSLAM 101. Such a connection takes place when customer premises equipment 104 initiates a connection with DSLAM 101. An invalid connection is a connection associated with customer premises equipment 104 that has failed the authentication procedure and therefore is not authorized to communicate information to network 114.

During operation, DSLAM 101 updates table 210 to reflect new information about particular connections. When DSLAM 101 initially accepts a connection with customer premises equipment 104, DSLAM 101 generates an entry for table 210 with unverified status 214. While a connection is active, DSLAM 101 maintains context 216 for each connection. Context 216 tracks usage information for each connection, such as the number of cells sent or received over the connection.

After the connection is established, DSLAM 101 attempts to determine whether the particular customer premises equipment 104 forming the connection is authorized for network 114. If customer premises equipment 104 is not authorized, DSLAM 101 updates status 214 for that connection to invalid. Subsequent information from that connection may then be discarded by DSLAM 101, and DSLAM 101 may exclude that connection from any broadcasts. The connection may also be terminated. DSLAM 101 may also maintain invalid status 214 for the connection in table 210, so that subsequent attempts by unauthorized customer premises equipment 104 to establish a connection may be rejected.

On the other hand, if customer premises equipment 104 is authenticated, then DSLAM 101 updates status 214 for the connection to verified. DSLAM 101 permits customer premises equipment 104 on a verified connection to exchange information freely with network 114. DSLAM 101 may also include verified connections in subsequent broadcasts to customer premises equipment 104. By contrast, information from unverified connections may be buffered or otherwise kept from network 114 until the connection is verified. Similarly, DSLAM 101 may exclude unverified connections from broadcasts.

Figure 4:
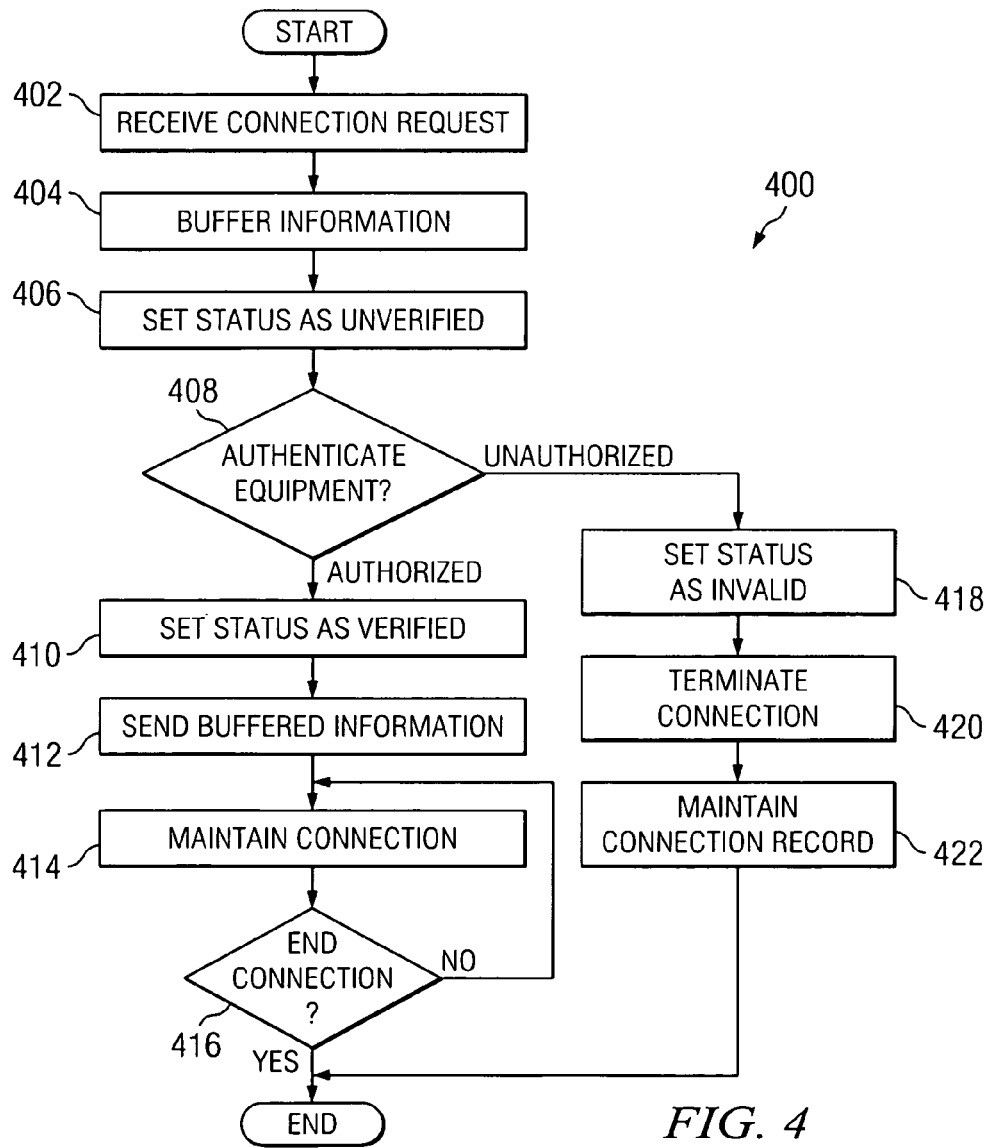
FIG. 4 is a flowchart that illustrates an example method for automatic configuration of a DSLAM.

FIG. 4 is a flow chart 400 that illustrates an example method for automatically recognizing customer premises equipment 104 at DSLAM 101. DSLAM 101 receives a connection request from unrecognized customer premises equipment 104 at step 402. DSLAM 101 buffers information received over that connection at step 404 and sets status 214 for the connection as unverified at step 406.

DSLAM 101 then authenticates unrecognized customer premises equipment 104 at step 408. If customer premises equipment 104 is authorized, DSLAM 101 sets status 214 as verifies and communicates buffered information to network 114. DSLAM 101 then maintains the connection at step 414, allowing information to be sent back and forth between customer premises equipment 104 and network 114. DSLAM 101 may also maintain context 216 for the connection. The connection may be maintained until ended, as shown by decision step 416.

If customer premises equipment 104 is unauthorized, DSLAM 101 sets status 214 for the connection as invalid at step 418. DSLAM 101 may then terminate the connection at step 420, or alternatively, may maintain the connection and allow customer premises equipment 104 one or more additional attempts to verify its authorization. If a connection is terminated, any buffered packets and subsequent packets received from the invalid connection may be discarded. DSLAM 101 may maintain status 214 of the connection so that subsequent attempts by invalid customer premises equipment 104 to re-establish the connection may be ignored.

Figure 5:
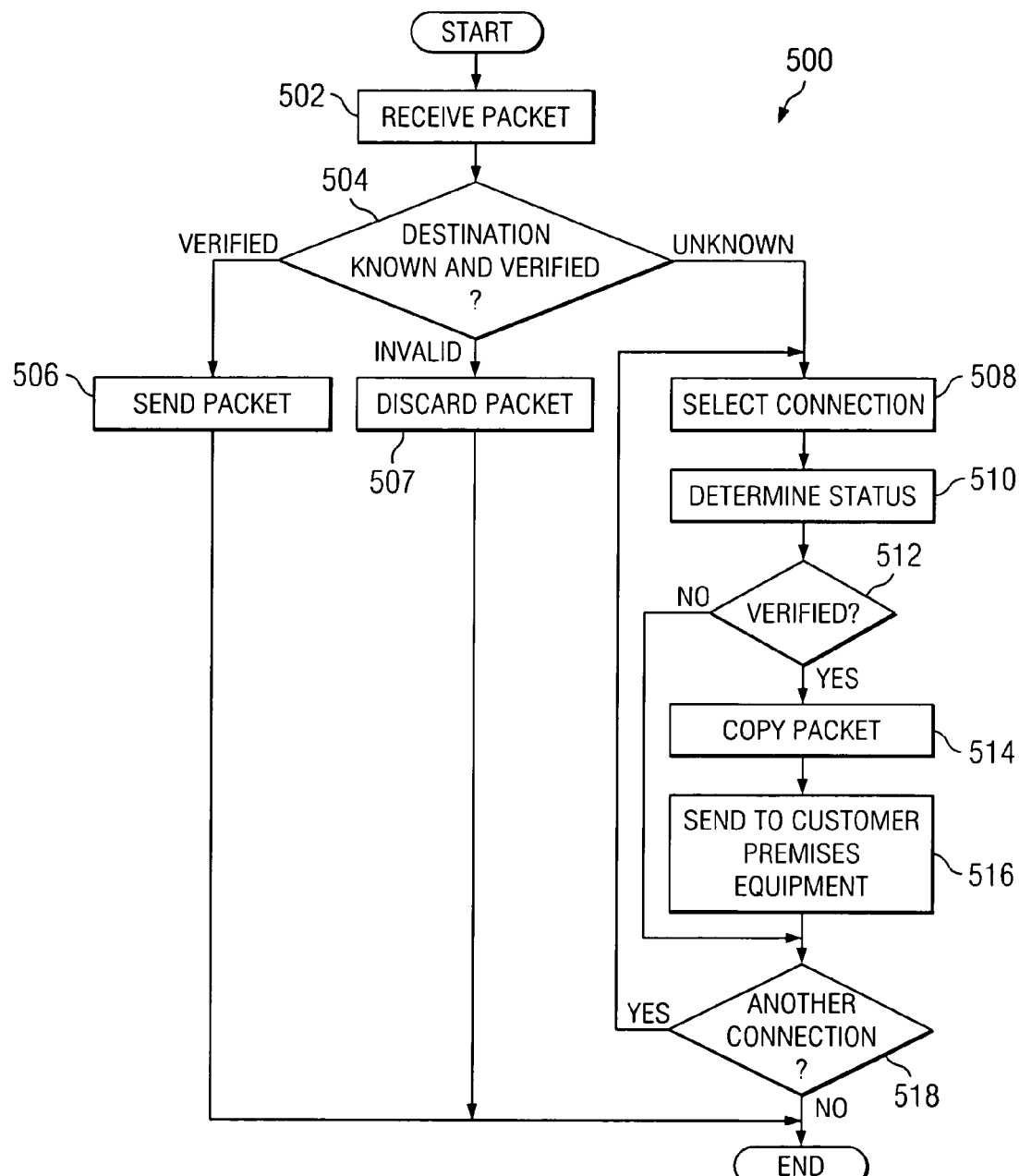
FIG. 5 is a flowchart illustrating an example method for broadcasting information to recognized customer premises equipment.

FIG. 5 is a flow chart 500 that illustrates an example method for broadcasting messages to customer premises equipment 104. DSLAM 101 receives a packet from network 114 at step 502. DSLAM 101 determines whether a destination indicated by the packet is known and verified at step 504. For example, DSLAM 101 may consult table 210 to determine whether a particular connection is active that corresponds to the destination of the packet. If DSLAM 101 recognizes the destination as a verified connection, DSLAM 101 communicates the packet to the destination at step 506. If DSLAM 101 recognizes the destination as being associated with an invalid connection, DSLAM 101 may discard the packet at step 507.

If the destination is unknown to DSLAM 101, DSLAM 101 may broadcast the information in the packet to known and verified destinations. DSLAM 101 selects a first connection in table 210 at step 508. DSLAM 101 determines status 214 for the connection at step 510. Based on the status, DSLAM 101 determines whether the connection is verified at step 512. If the connection is verified, DSLAM 101 copies the packet at step 514 and communicates the packet to customer premises equipment 104 using the verified connection at step 516. Otherwise, DSLAM 101 does not send the packet to unverified or invalid customer premises equipment 104. Steps 508 through 518 may be repeated for the remaining connections in table 210, as shown in decision step 518.

The particular methods of operation described in FIGS. 4 and 5 are only examples, and it should be understood that different embodiments of DSLAM 101 may use different methods of operation. For example, DSLAM 101 may allow customer premises equipment 104 on unverified connections to exchange information with network 114 and receive broadcasts before customer premises equipment 104 is authenticated. It should be understood that other methods of operation, and in particular, any method of operation consistent with any part of the description found above, may also be performed by DSLAM 101.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing asynchronous transfer mode (ATM) connections between a digital subscriber line add-drop multiplexer (DSLAM) and customer premises equipment, comprising:
   establishing a plurality of ATM connections with customer premises equipment, the step of establishing each ATM connection comprising:
      receiving a request for an ATM connection with unrecognized customer premises equipment at a DSLAM;
      establishing the ATM connection between the DSLAM and the unrecognized customer premises equipment;
      associating the ATM connection with a status, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network; and
      setting the status of the ATM connection to unverified;
   authenticating each of the ATM connections, the step of authenticating comprising:
      authenticating the customer premises equipment associated with each connection;
      if the unrecognized customer premises equipment is authenticated, setting the status of the connection to verified; and
      if the unrecognized customer premises equipment is not authenticated, setting the status of the connection to invalid;
   providing access to the network to each ATM connection according to the current status of the ATM connection;
   receiving a packet from the network having an unrecognized destination;
   identifying all of the ATM connections that have a status of verified;
   generating a copy of the packet for each of the verified ATM connections; and
   communicating one of the copies of the packet in the form of ATM cells to the customer premises equipment associated with each of the verified ATM connections.

2. A method for automatically configuring a digital subscriber line add-drop multiplexer (DSLAM), comprising:
   receiving a request for a connection with unrecognized customer premises equipment at a DSLAM;
   establishing the connection between the DSLAM and the unrecognized customer premises equipment;
   associating the connection with a status, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;
   setting the status of the connection to unverified;
   authenticating the unrecognized customer premises equipment;
   if the unrecognized customer premises equipment is authenticated, setting the status of the connection to verified;
   if the unrecognized customer premises equipment is not authenticated, setting the status of the connection to invalid; and
   providing access to the network according to the current status of the connection.

3. The method of claim 2, wherein:
   the connection between the DSLAM and unrecognized customer premises equipment comprises an asynchronous transfer mode (ATM) connection; and
   information is communicated between the DSLAM and the unrecognized customer premises equipment in the form of ATM cells over DSL.

4. The method of claim 2, wherein:
   the connection is one of a plurality of connections; and
   the method further comprises maintaining a connection table for all of the connections to the DSLAM, the connection table comprising:
      a connection identifier for each connection; and
      the associated status of each connection.

5. The method of claim 4, further comprising:
   receiving a packet from the network having an unspecified destination;
   identifying all of the connections that are associated with a status of verified;
   generating one copy of the packet for each verified connection; and
   communicating one of the copies of the packet to the unrecognized customer premises equipment associated with each of the verified connections.

6. The method of claim 2, wherein providing access to the network comprises:
   buffering information received from the connection while the status of the connection is unverified;
   communicating the buffered information to the network if the status of the connection is set to verified; and
   discarding the buffered information if the status of the connection is set to invalid.

7. A digital subscriber line add-drop multiplexer (DSLAM), comprising:
   an interface operable to receive a request for a connection with unrecognized customer premises equipment and to establish the connection with the unrecognized customer premises equipment;

a memory operable to store a connection identifier and a status for the connection, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;

a processor operable to:
  set the status of the connection as unverified when the connection is established;
  authenticate the unrecognized customer premises equipment;
  set the status of the connection as verified if the unrecognized customer premises equipment is authenticated;
  set the status of the connection as invalid if the unrecognized customer premises equipment is not authenticated; and
  provide access to the network according to the current status of the connection.

8. The DSLAM of claim 7, wherein:
the connection between the DSLAM and the unrecognized customer premises equipment comprises an asynchronous transfer mode (ATM) connection; and
information is communicated between the DSLAM and the unrecognized customer premises equipment in the form of ATM cells over DSL.

9. The DSLAM of claim 7, wherein:
the connection is one of a plurality of connections; and
the memory is further operable to store a connection table for all of the connections to the DSLAM, the connection table comprising:
  a connection identifier for each connection; and
  the associated status of each connection.

10. The DSLAM of claim 9, wherein the processor is further operable to:
  receive a packet from the network having an unspecified destination;
  identify all of the connections that are associated with a status of verified;
  generate one copy of the packet for each verified connection; and
  communicate one of the copies of the packet to the customer premises equipment associated with each of the verified connections.

11. The DSLAM of claim 7, wherein the processor is further operable to:
  buffer information received from the connection in the memory while the status of the connection is unverified;
  communicate the buffered information to the network if the status of the connection is set to verified; and
  discard the buffered information if the status of the connection is set to invalid.

12. Logic embodied in a computer-readable medium, operable when executable by a computer, to perform the steps of:
  receiving a request for a connection with unrecognized customer premises equipment at a DSLAM;
  establishing the connection between the DSLAM and the unrecognized customer premises equipment;
  associating the connection with a status, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;
  setting the status of the connection to unverified;
  authenticating the unrecognized customer premises equipment;
  if the unrecognized customer premises equipment is authenticated, setting the status of the connection to verified;
  if the unrecognized customer premises equipment is not authenticated, setting the status of the connection to invalid; and
  providing access to the network according to the current status of the connection.

13. The logic of claim 12, wherein:
the connection is one of a plurality of connections; and
the logic is further operable to maintain a connection table for all of the connections to the DSLAM, the connection table comprising:
  a connection identifier for each connection; and
  the associated status of each connection.

14. The logic of claim 13, wherein the logic is further operable to perform the steps of:
  receiving a packet from the network having an unspecified destination;
  identifying all of the connections that are associated with a status of verified;
  generating one copy of the packet for each verified connection; and
  communicating one of the copies of the packet to the unrecognized customer premises equipment associated with each of the verified connections.

15. The logic of claim 12, wherein the logic is further operable to perform the steps of:
  buffering information received from the connection while the status of the connection is unverified;
  communicating the buffered information to the network if the status of the connection is set to verified; and
  discarding the buffered information if the status of the connection is set to invalid.

16. A method for broadcasting information to a plurality of asynchronous transfer mode (ATM) connections between customer premises equipment and a digital subscriber add-drop multiplexer (DSLAM), comprising:
  maintaining connection information for each of a plurality of ATM connections between a DSLAM and customer premises equipment, the connection information comprising a connection identifier and a status for the connection, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;
  receiving a packet from the network having an unrecognized destination;
  identifying the ATM connections having a status of verified;
  generating one copy of the packet for each verified connection; and communicating one of the copies of the packet in the form of ATM cells to the customer premises equipment associated with each of the verified connections.

17. The method of claim 16, further comprising:
identifying the connections having a status of unverified;
generating one copy of the packet for each of the unverified connections; and
communicating one of the copies of the packet in the form of ATM cells to the customer premises equipment associated with each of the unverified connections.

18. The method of claim 16, further comprising:
identifying the connections having a status of unverified;
generating one copy of the packet for each of the unverified connections;
buffering the copy of the packet; and
communicating one of the copies of the packet in the form of ATM cells to the customer premises equipment associated with each of the unverified connections.

19. A DSLAM, comprising:
means for maintaining connection information for each of a plurality of ATM connections between a DSLAM and customer premises equipment, the connection information comprising a connection identifier and a status for the connection, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;
means for receiving a packet from the network having an unrecognized destination;
means for identifying the ATM connections having a status of verified;
means for generating one copy of the packet for each verified connection; and
means for communicating one of the copies of the packet in the form of ATM cells to the customer premises equipment associated with each of the verified connections.

20. The DSLAM of claim 19, further comprising:
means for identifying the connections having a status of unverified;
means for generating one copy of the packet for each of the unverified connections; and
means for communicating one of the copies of the packet in the form of ATM cells to the customer premises equipment associated with each of the unverified connections.

21. The DSLAM of claim 19, further comprising:
means for identifying the connections having a status of unverified;
means for generating one copy of the packet for each of the unverified connections;
means for buffering the copy of the packet; and
means for communicating one of the copies of the packet in the form of ATM cells to the customer premises equipment associated with each of the unverified connections.

22. Logic embodied in a computer-readable medium, operable when executable by a computer, to perform the steps of:
maintaining connection information for each of a plurality of ATM connections between a DSLAM and customer premises equipment, the connection information comprising a connection identifier and a status for the connection, the status comprising three possible states, the three possible states comprising an unverified state, a verified state, and an invalid state, wherein the verified state indicates that the connection is allowed full access to a network, the unverified state indicates that the connection is allowed conditional access to the network, and the invalid state indicates that the connection is not allowed to access the network;
receiving a packet from the network having an unrecognized destination;
identifying the ATM connections having a status of verified;
generating one copy of the packet for each verified connection; and
communicating one of the copies of the packet in the form of ATM cells to the customer premises equipment associated with each of the verified connections.

23. The logic of claim 22, further operable to perform the steps of:
identifying the connections having a status of unverified;
generating one copy of the packet for each of the unverified connections; and
communicating one of the copies of the packet in the form of ATM cells to the customer premises equipment associated with each of the unverified connections.

24. The logic of claim 22, further operable to perform the steps of:
identifying the connections having a status of unverified;
generating one copy of the packet for each of the unverified connections;
buffering the copy of the packet; and
communicating one of the copies of the packet in the form of ATM cells to the customer premises equipment associated with each of the unverified connections.

* * * * *